(12) United States Patent
Lin et al.

(10) Patent No.: US 7,570,830 B2
(45) Date of Patent: Aug. 4, 2009

(54) TEST METHOD FOR IMAGE SHARPNESS

(75) Inventors: Peng Wei Lin, Hsinchu (TW); Chan Min Chou, Hsinchu (TW)

(73) Assignee: Altek Corporation, Hsinchu (TW)

( * ) Notice: Subject to any disclaimer, the term of this patent is extended or adjusted under 35 U.S.C. 154(b) by 692 days.

(21) Appl. No.: 11/376,208

(22) Filed: Mar. 16, 2006

(65) Prior Publication Data
US 2007/0217707 A1  Sep. 20, 2007

(51) Int. Cl.
*G06K 9/40* (2006.01)
(52) U.S. Cl. ........................ 382/254; 382/263; 382/274; 382/275; 358/3.26; 358/3.27
(58) Field of Classification Search ................. 382/260, 382/263, 264, 274, 275; 358/3.26, 3.27, 358/463
See application file for complete search history.

(56) References Cited

U.S. PATENT DOCUMENTS

| | | | | |
|---|---|---|---|---|
| 5,353,355 | A * | 10/1994 | Takagi et al. ................. 382/111 |
| 6,275,718 | B1 * | 8/2001 | Lempert ........................ 600/407 |
| 6,696,232 | B2 * | 2/2004 | Sowinski ...................... 430/506 |
| 6,919,892 | B1 * | 7/2005 | Cheiky et al. ................ 345/473 |
| 7,027,054 | B1 * | 4/2006 | Cheiky et al. ................ 345/473 |

\* cited by examiner

*Primary Examiner*—Yosef Kassa
(74) *Attorney, Agent, or Firm*—Rosenberg, Klein & Lee

(57) ABSTRACT

The present invention discloses a test method for image sharpness, which can instantly determine the sharpness of a captured image, wherein a captured image is firstly divided into multiple blocks with each block composed of multiple pixels; in each block of the captured image, the pixels having higher sharpnesses are selected, and the sharpnesses of those pixels are summed up to be the sharpness of the related block; the estimated sharpness of the captured image is also obtained similarly; and the estimated sharpness is compared with a threshold value to determine whether the captured image is sharp enough. Thereby, the present invention can test the sharpness of an image fast and correctly and inform the user of the status of the captured image and provide the user with corresponding suggestions.

15 Claims, 2 Drawing Sheets

TEST METHOD FOR IMAGE SHARPNESS

BACKGROUND OF THE INVENTION

1. Field of the Invention

The present invention relates to a test method for image, particularly to a fast and high-correctness test method for image sharpness.

2. Description of the Related Art

With the advance of electronic industries, many digital video devices have emerged, such as digital cameras, digital video cameras, and mobile phones with a digital camera. As to digital cameras, the user can check the captured pictures in situ or anytime later from the attached LCD viewer of a digital camera; further, a digital camera directly records an image by digital data, which makes the processing and storage of the pictures more convenient; besides, the size of a digital camera is much smaller than that of a conventional camera, and thus, the portability of a digital camera is also much better than that of a conventional camera. Therefore, the market share of digital cameras has exceeded that of the conventional cameras.

Owing to the progress of optoelectronics, the image quality of a digital camera has been greatly promoted from several hundred thousand pixels to more than twelve million pixels. Even magnified many times, such a high-pixel image can still maintain its definition. When the user takes a picture, there is usually a vibration transmitted from the hand to the digital camera. Even though the vibration during taking a picture is very slight, the captured image may still be blurred. When viewed in situ, such an image, which is display on the LCD viewer of the digital camera, may seem sharp because the size of a common LCD viewer is usually small and less than 3.5 in. However, the image will appear indistinct when it is displayed in a large-size LCD or printed on a photo paper, i.e. observed in magnification. Thus, the LCD viewer of a digital camera may not always present the real status of an image. Usually, the user does not perceive such a fact until the image is processed in a computer or printed on a photo paper.

To solve the abovementioned problem, Microsoft Corporation proposed a test method for image unsharpness (U.S. Pat. No. 6,548,8000), wherein multiple images are analyzed with an identical edge parameter to determine the unsharpness thereof. However, in such a method, each image needs multiple pantograph operations, which needs a big memory and a lot of calculation time. Further, the test results are not so good as expected. Therefore, how to develop a fast and effective image-sharpness test method has become one of the problems the industry must overcome.

Accordingly, the present invention proposes a test method for image sharpness, which can fast and correctly test image sharpness, to overcome the abovementioned problems.

SUMMARY OF THE INVENTION

The primary objective of the present invention is to provide a test method for image sharpness, wherein a captured image is divided into multiple blocks; the sharpness of each block is test, and the test results are summed up to be the sharpness of the captured image; the sharpness of the captured image is used to determine whether the captured image is sharp enough, and the user is informed of the status of the captured image; thereby, the photographic error can be reduced, and the photographic efficiency can be promoted.

Another objective of the present invention is to provide a test method for image sharpness, which is distinct from the conventional technology that needs a big memory and a lot of calculation time and can fast determine the sharpness of an image.

To achieve the abovementioned objectives, the present invention proposes a test method for image sharpness, wherein a captured image is divided into multiple blocks with each block composed of multiple pixels; in each block of the captured image, the pixels having higher sharpnesses are selected, and the sharpnesses of those pixels are summed up to be the sharpness of the related block; then, the blocks having higher sharpnesses are selected, and the sharpnesses of those blocks are summed up to be the estimated sharpness of the captured image; and the estimated sharpness is compared with a threshold value to determine whether the captured image is sharp enough.

To enable the objectives, technical contents, characteristics, and accomplishments of the present invention to be more easily understood, the embodiments of the present invention are to be described below in detail in cooperation with the attached drawings.

DETAILED DESCRIPTION OF THE INVENTION

The present invention is a test method for image sharpness, which applies to an electronic camera device, such as a digital camera, a digital video camera or a mobile phone with a digital camera. When an electronic camera device is used to capture a picture, the present invention not only can instantly determine the sharpness of the captured image but also can tell the user whether the captured image is sharp enough so that the user can in-situ grasp the quality of the captured image.

Figure 1:
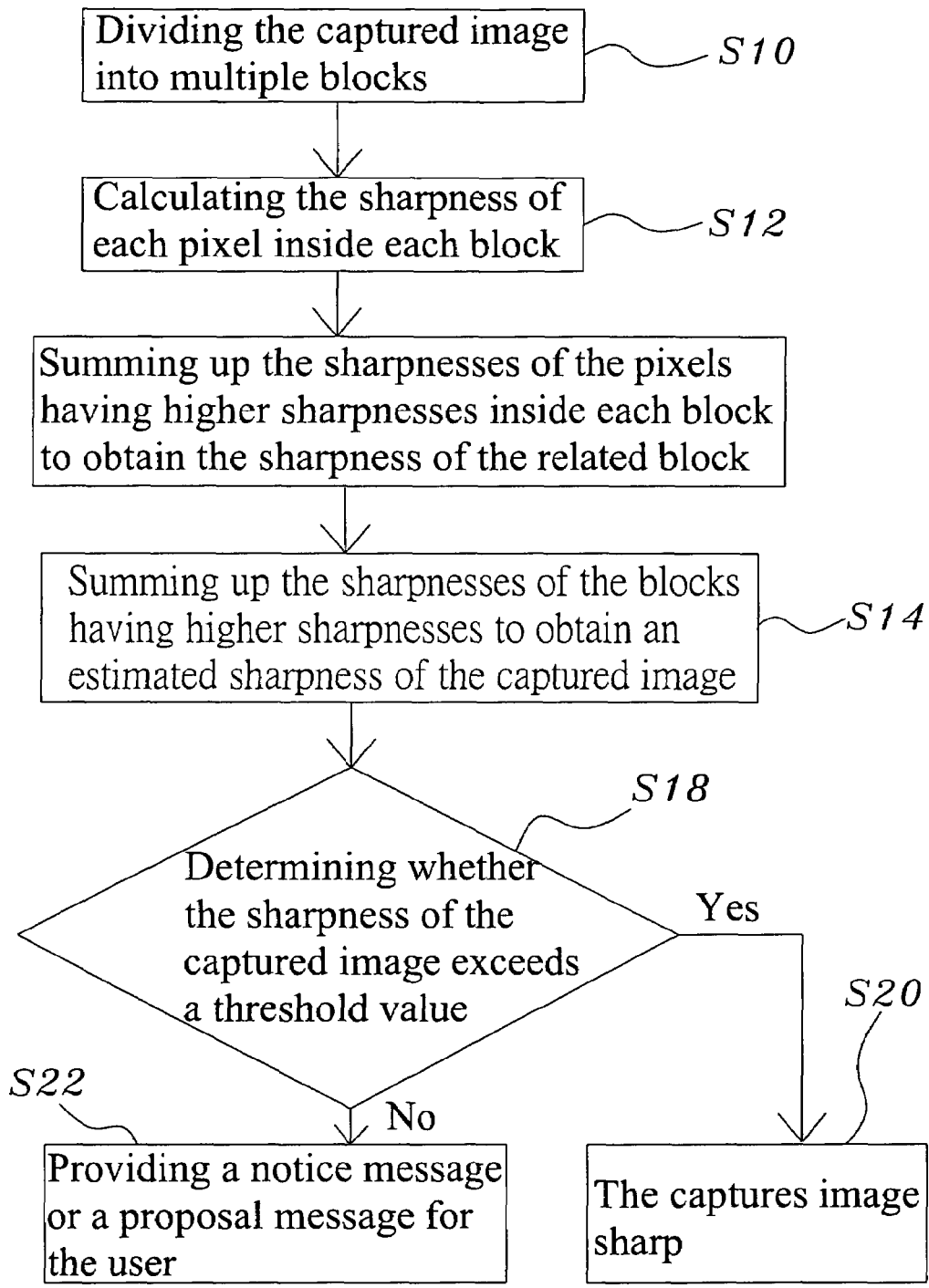
FIG. 1 is a flowchart of the test method for image sharpness according to the present invention.
Figure 2:
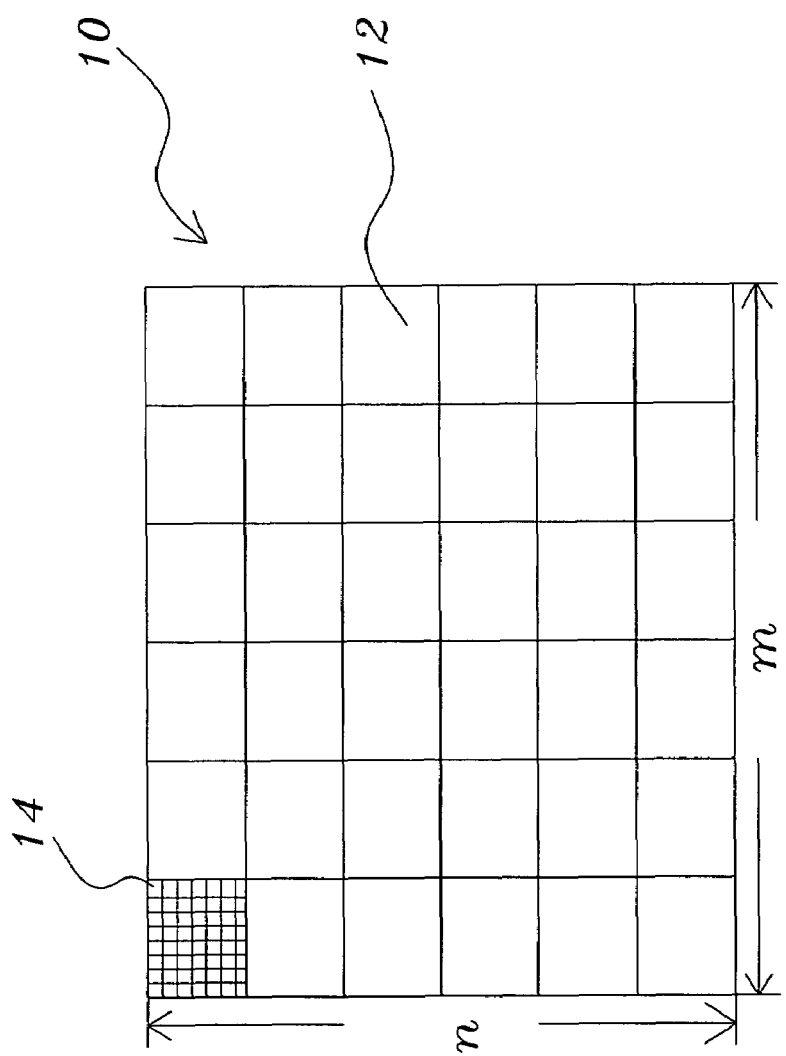
FIG. 2 is a diagram schematically showing the pixels and the divided blocks of the captured image according to present invention.

A digital camera is used to exemplify the embodiment of the present invention. Refer to FIG. 1 and FIG. 2. The sharpness of image 10 captured by the digital camera is to be determined with the method of the present invention. Firstly, the captured image 10 is divided into m×n blocks 12 (Step S10) with each block 12 composed of multiple pixels 14, wherein m may be equal to or not equal to n. Next, the sharpness of each pixel 14 of each block 12 is calculated (Step S12), wherein a factor selected from the group consisting of Red value, Green value, Blue value and Gray value of the pixel 14, or a combination of them, is used to calculate sharpness, and the calculation equation is:

$$\text{Block sharpness} = \max([\text{Gray}(i,j) - \text{Gray}(i-1,j)], [\text{Gray}(i,j) - \text{Gray}(i,j-1)]) \quad (1);$$

in this embodiment, Gray value is used to calculate sharpness, and (i, j) is the coordinate of the pixel.

Next, after the sharpness of each pixel 14 has been known, the sharpnesses of the pixels having higher sharpnesses are summed up to be the sharpness of the related block 12 (Step S14), wherein the pixels having higher sharpnesses means that the selected pixels have the sharpnesses within from top 0.1% to top 60% sharpnesses inside the related block 12. Next, after the sharpness of each block 12 has been known, the sharpnesses of the blocks 12 having the sharpnesses within from top 10% to top 50% sharpnesses are summed up to be an estimated sharpness of the captured image 10 (Step S16). Next, the estimated sharpness of the captured image 10 is compared with a threshold value to determine whether the sharpness of the captured image 10 is greater than the threshold value (Step S18); if the estimated sharpness is greater than the threshold value, the captured image is a sharp one; if the estimated sharpness is lower than the threshold value, the captured image is unsharp.

If the captured image 10 is determined to be sharp, the digital camera will not undertake any action (Step S20). If the captured image 10 is determined to be unsharp, the digital camera will provide a notice message or a proposal message for the user (Step S22), wherein the notice message may be presented with a beep, a light, or a flash, or directly presented on the LCD screen of the digital camera; the proposal message, such as increasing light sensitivity, or using a tripod, is presented on the LCD screen.

The threshold value is a key factor to the sharpness test of the present invention and will vary with the preset parameters of the digital camera and environmental parameters. The preset parameters include: shutter speed, field depth, aperture, focal length and viewing angle. The environmental parameters include: the object, brightness, and background. In Step S18, the threshold value will be appropriately selected according to the preset parameters of the digital camera and the environmental parameters so that the estimated sharpness can be more reliable.

In summary, the present invention proposes a test method for image sharpness, wherein a captured image is divided into multiple blocks; in each block, the sharpnesses of the pixels having the sharpnesses within from top 0.1% to top 60% sharpnesses are summed up to be the sharpness of the related block; the sharpnesses of the blocks having the sharpnesses within from top 10% to top 50% sharpnesses are also summed up to be the sharpness of the captured image; and the estimated sharpness of the captured image is compared with a threshold value to determine whether the captured image is sharp. The test method of the present invention needs less memory space and spends less calculation time and can overcome the problems of the conventional technology. Further, the present invention can tell the user the status of the captured image, reduce photographic errors and promote photographic efficiency.

The abovementioned embodiments is to clarify the present invention in order to enable the persons skilled in the art to understand, make, and use the present invention; however, it is not intended to limit the scope of the present invention, and any equivalent modification and variation according to the spirit of the present invention is to be also included within the scope of the claims stated below.

What is claimed is:

1. A test method for image sharpness, which can instantly determine the sharpness of an image after an electronic camera device has captured the image, comprising the following steps:

dividing said image into multiple blocks with each said block composed of multiple pixels;

summing up the sharpnesses of said pixels having higher sharpnesses inside each said block to obtain the sharpness of the related said block;

summing up the sharpnesses of said blocks having higher sharpnesses to obtain an estimated sharpness of said image; and comparing said estimated sharpness with a threshold value to determine whether said image is sharp.

2. The test method for image sharpness according to claim 1, wherein said pixels having the sharpnesses within from top 0.1% to top 60% sharpnesses are selected, and the sharpnesses of the selected pixels are summed up to obtain the sharpness of the related said block.

3. The test method for image sharpness according to claim 1, wherein said blocks having the sharpnesses within from top 10% to top 50% sharpnesses are selected, and the sharpnesses of the selected blocks are summed up to obtain an estimated sharpness of said image.

4. The test method for image sharpness according to claim 1, wherein said threshold value varies with environmental parameters in the moment of capturing said image.

5. The test method for image sharpness according to claim 4, wherein said environmental parameters include: brightness, background and the object.

6. The test method for image sharpness according to claim 1, wherein said threshold value varies with the preset parameters of said electronic camera device.

7. The test method for image sharpness according to claim 6, wherein said preset parameters include: shutter speed, field depth, aperture, focal length and viewing angle.

8. The test method for image sharpness according to claim 1, wherein a factor selected from the group consisting of Red value, Green value, Blue value and Gray value of said pixel, or a combination of them, is used to calculate sharpness, and the calculation equation is:

$$\text{sharpness} = \max([\text{Gray}(i,j) - \text{Gray}(i-1,j)], [\text{Gray}(i,j) - \text{Gray}(i,j-1)]),$$

and said Gray value used to exemplify said calculation equation, and (i, j) is the coordinate of said pixel.

9. The test method for image sharpness according to claim 1, wherein said electronic camera device may be a digital camera, a digital video camera, or a mobile phone with a digital camera.

10. The test method for image sharpness according to claim 1, further comprising a step of providing a notice message for the user after said image has been determined to be unsharp.

11. The test method for image sharpness according to claim 10, wherein said notice message is presented with a beep, a light, or a flash.

12. The test method for image sharpness according to claim 11, wherein said notice message is presented on a display of said electronic camera device.

13. The test method for image sharpness according to claim 1, further comprising a step of providing a proposal message for the user after said image has been determined to be unsharp.

14. The test method for image sharpness according to claim 13, wherein said proposal message may be increasing light sensitivity or using a tripod.

15. The test method for image sharpness according to claim 14, wherein said proposal message is presented on a display device of said electronic camera device.

* * * * *